US012352246B2

(12) United States Patent
Naganna et al.

(10) Patent No.: US 12,352,246 B2
(45) Date of Patent: Jul. 8, 2025

(54) RECOVERING WIND POWER FROM REMOTE VEHICLES

(71) Applicant: International Business Machines Corporation, Armonk, NY (US)

(72) Inventors: Soma Shekar Naganna, Bangalore (IN); Abhishek Seth, Deoband (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 17/517,097

(22) Filed: Nov. 2, 2021

(65) Prior Publication Data
US 2023/0134875 A1    May 4, 2023

(51) Int. Cl.
*F03D 7/00*        (2006.01)
*F03D 9/30*        (2016.01)
(Continued)

(52) U.S. Cl.
CPC ............... *F03D 9/30* (2016.05); *F03D 7/00* (2013.01); *G05B 15/02* (2013.01); *G08G 5/54* (2025.01);
(Continued)

(58) Field of Classification Search
CPC .. F03D 9/30; F03D 7/00; G05B 15/02; G08G 5/02; F05B 2220/70; F05B 2220/706
See application file for complete search history.

(56) References Cited

U.S. PATENT DOCUMENTS 5,998,882 A * 12/1999 Alston ............... F03D 9/22
                                                  60/226.1
7,380,751 B1 * 6/2008 Henson ............... F03D 9/12
                                                  244/1 R
(Continued)

FOREIGN PATENT DOCUMENTS

FR        3091518 A1    7/2020
JP        2020190206 A  11/2020
WO        2018106235 A1  6/2018

OTHER PUBLICATIONS

"Air-Flow Visualization for Several Rotor Configuration", NASA Langley CRGIS, Jul. 27, 2009, 3 pgs., <https://www.youtube.com/watch?v=rxO5DdkJhcc>.
(Continued)

*Primary Examiner* — Scott T Baderman
*Assistant Examiner* — Mario M Velez-Lopez
(74) *Attorney, Agent, or Firm* — Anthony M. Pallone (57) ABSTRACT

Disclosed are techniques for recovering power from remote vehicles near a landing surface. Air turbulence from a remote vehicle near a landing surface is detected and measured. When the air turbulence exceeds a threshold, a subset of landing surface components corresponding to sections of the landing surface with attached wind power generators are determined for wind power generation from the detected air turbulence. The wind power generators of the subset of landing surface components are exposed from their protective coverings, and the subset of landing surface components are reoriented towards the source of the air turbulence, tracking the remote vehicle generating the air turbulence. Power generated by the wind power generators can be stored and used to recharge remote vehicles that land at the landing surface.

18 Claims, 6 Drawing Sheets

(51) Int. Cl.
   *G05B 15/02* (2006.01)
   *G08G 5/02* (2006.01)
   *G08G 5/54* (2025.01)
(52) U.S. Cl.
   CPC ..... *F05B 2220/70* (2013.01); *F05B 2220/706* (2013.01)

(56) References Cited

U.S. PATENT DOCUMENTS

| | | | | |
|---|---|---|---|---|
| 8,967,946 | B2* | 3/2015 | Kimberg | F03D 9/007 415/4.2 |
| 9,080,551 | B2* | 7/2015 | Yudkovitz | F03D 9/25 |
| 9,784,244 | B1* | 10/2017 | Souryal | H02K 7/1838 |
| 11,784,536 | B1* | 10/2023 | Webb | B64F 1/36 244/12.3 |
| 12,095,207 | B2* | 9/2024 | Martin | H01R 13/6278 |
| 2002/0014554 | A1* | 2/2002 | Kirjavainen | B64C 39/001 244/17.11 |
| 2009/0250936 | A1* | 10/2009 | Souryal | F03D 9/255 290/55 |
| 2010/0276940 | A1* | 11/2010 | Khavari | F03D 9/43 290/55 |
| 2011/0133454 | A1* | 6/2011 | Vo | F03D 9/25 290/55 |
| 2015/0183528 | A1* | 7/2015 | Walsh | A47G 29/14 244/114 R |
| 2015/0285223 | A1* | 10/2015 | Sanchez | H02J 7/34 290/55 |
| 2015/0307201 | A1 | 10/2015 | Criado | |
| 2016/0196756 | A1* | 7/2016 | Prakash | B64U 70/95 701/3 |
| 2016/0250933 | A1* | 9/2016 | Kim | B64U 50/19 320/108 |
| 2017/0344000 | A1* | 11/2017 | Krishnamoorthy | G08G 5/25 |
| 2018/0226860 | A1* | 8/2018 | Glatfelter | H02K 7/1823 |
| 2019/0023133 | A1* | 1/2019 | Renold | B60L 53/35 |
| 2021/0011488 | A1* | 1/2021 | Kearney-Fischer | G01S 17/95 |
| 2022/0374002 | A1* | 11/2022 | Bär | G06N 3/006 |
| 2023/0038157 | A1* | 2/2023 | Gao | B08B 7/0042 |

OTHER PUBLICATIONS

"Lift (force)", Wikipedia, Wikimedia Foundation, Last edited on Aug. 17, 2021, Downloaded from the Internet on Aug. 24, 2021, 31 pgs., <https://en.wikipedia.org/wiki/Lift_(force)>.

Allain, R., "How Do Drones Fly? Physics, of Course!", Wired.com, May 19, 2017, 9 pgs., <https://www.wired.com/2017/05/the-physics-of-drones/>.

Corrigan, F., "How a Quadcopter Works Along With Propellers and Motors", Dronezon.com, May 6, 2020, 29 pgs., <https://www.dronezon.com/learn-about-drones-quadcopters/how-a-quadcopter-works-with-propellers-and-motors-direction-design-explained/>.

Levin, S., "Amazon Patents Beehive-Like Structure to House Delivery Drones in Cities", The Guardian, Jun. 26, 2017, 5 pgs., <https://www.theguardian.com/technology/2017/jun/26/amazon-drones-delivery-beehive-patent>.

* cited by examiner

RECOVERING WIND POWER FROM REMOTE VEHICLES

BACKGROUND

The present invention relates generally to the field of remote vehicles, and more particularly to energy recovery landing zones for remote vehicles.

Wind power or alternatively wind energy is the use of wind to provide mechanical power through wind turbines which turn electric generators for electrical power. Wind energy refers to the kinetic energy of air in motion, also called wind. A wind turbine is a device which transforms the wind's kinetic energy into electrical energy. Wind turbines are manufactured in a wide variety of sizes, with either horizontal or vertical axes.

A fluid flowing around the surface of an object exerts a force upon it. Lift is the component of this force that is applied perpendicular to the oncoming flow direction. It is in contrast with the drag force, which is the component of the force parallel to the flow direction. Lift frequently acts in an upward direction to counter the force of gravity, but can act in any direction at right (perpendicular) angles to the direction of the flow. If the surrounding fluid is air, the force is referred to as aerodynamic force.

SUMMARY

According to an aspect of the present invention, there is a method, computer program product and/or system for use with a remote vehicle landing zone having a landing surface including a plurality of independently moveable landing surface modules capable of three dimensional movement, where each independently moveable landing surface module further includes a wind power generation module that performs the following operations (not necessarily in the following order): (i) determining an air turbulence dataset corresponding to wind force(s) of air turbulence resulting from operation of a remote vehicle in the vicinity of the landing zone applied to at least some of the plurality of independently moveable landing surface modules; (ii) determining whether the wind force(s) are above a threshold value; (iii) responsive to determining that the wind force(s) are above a threshold value, determining a subset of the plurality of independently moveable landing surface modules based, at least in part, on the air turbulence dataset; and (iv) for at least some of the subset of the plurality of independently moveable landing surface modules, exposing their corresponding wind power generation module to generate electrical power based on the wind force(s) of the air turbulence resulting from operation of a remote vehicle in the vicinity of the landing zone.

DETAILED DESCRIPTION

Some embodiments of the present invention are directed to techniques for recovering power from remote vehicles near a landing surface. Air turbulence from a remote vehicle near a landing surface is detected and measured. When the air turbulence exceeds a threshold, a subset of landing surface components corresponding to sections of the landing surface with attached wind power generators are determined for wind power generation from the detected air turbulence. The wind power generators of the subset of landing surface components are exposed from their protective coverings, and the subset of landing surface components are reoriented towards the source of the air turbulence, tracking the remote vehicle generating the air turbulence. Power generated by the wind power generators can be stored and used to recharge remote vehicles that land at the landing surface.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
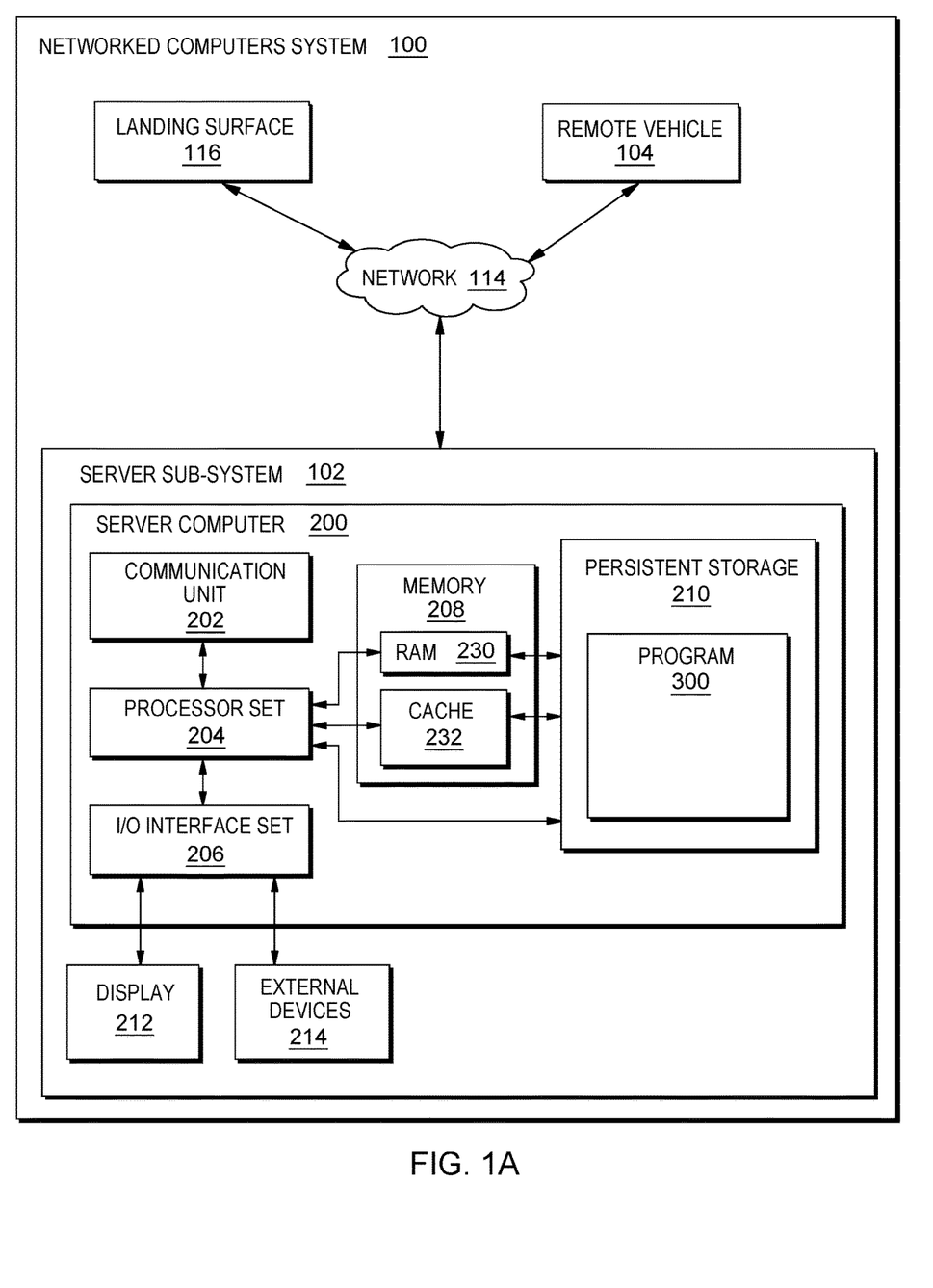
FIG. 1A is a block diagram view of a first embodiment of a system according to the present invention.

As shown in FIG. 1A, networked computers system 100 is an embodiment of a hardware and software environment for use with various embodiments of the present invention. Networked computers system 100 includes: server subsystem 102 (sometimes herein referred to, more simply, as subsystem 102); remote vehicle 104; communication network 114; and landing surface 116. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

Remote vehicles, as understood in the context of this document, are understood to be a type of aircraft vehicle without any pilot, crew, or passengers on board. Some remote vehicles include vertical takeoff and landing (VTOL) capabilities featuring a plurality of powered rotors, such as a quadcopter type of vehicle with four rotors. Remote vehicles operate with varying degrees of direct human intervention, from direct human piloting where a human provides input to control the remote vehicle, autopilot assisted operations, and full autonomy without direct human intervention. In this simplified embodiment, remote vehicle 104 is a fully autonomous quadcopter type of remote vehicle with VTOL capabilities that can hover, take off and land vertically.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 1B:
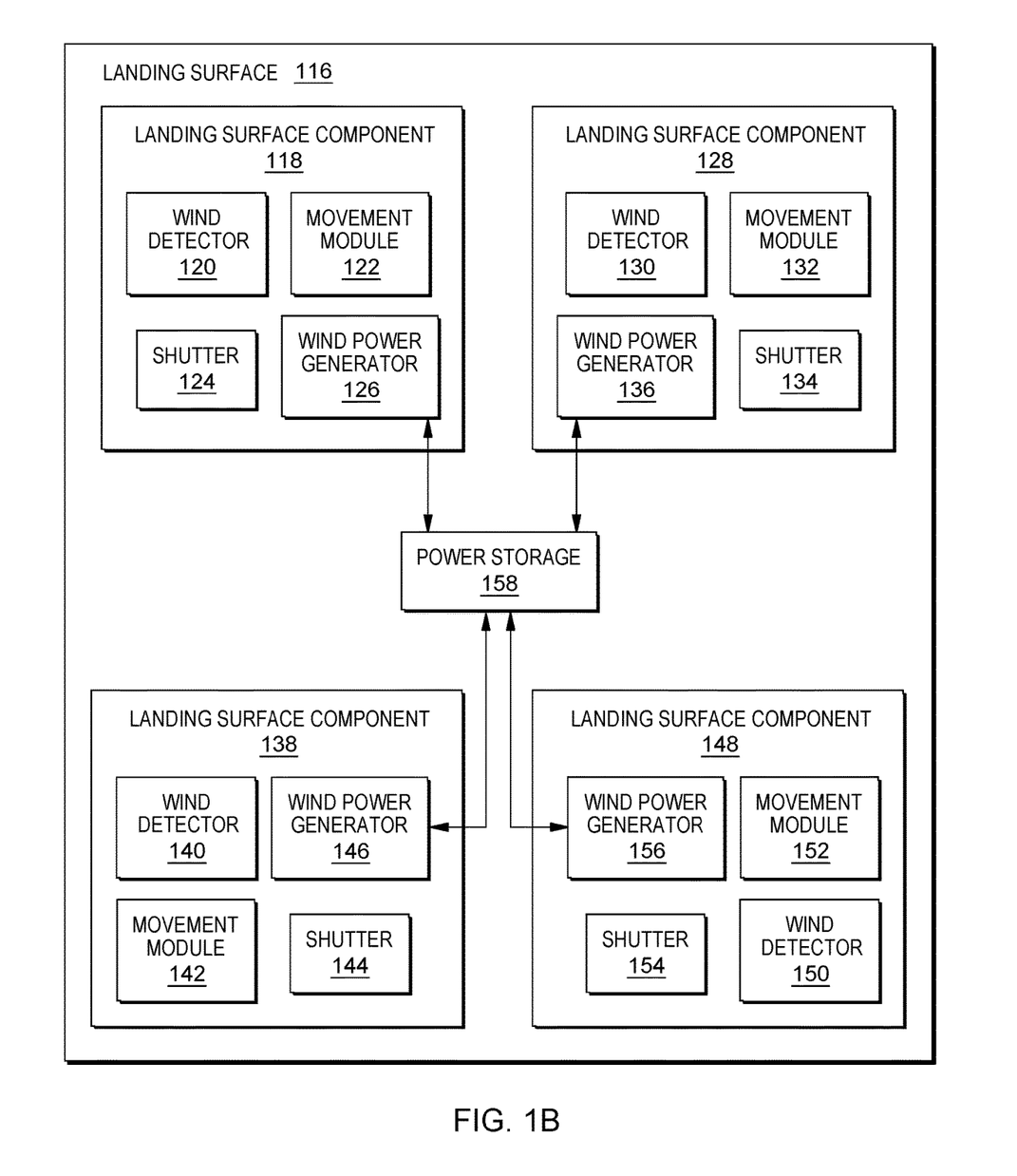
FIG. 1B is a block diagram view of a landing surface of the first embodiment system.
Figure 2:
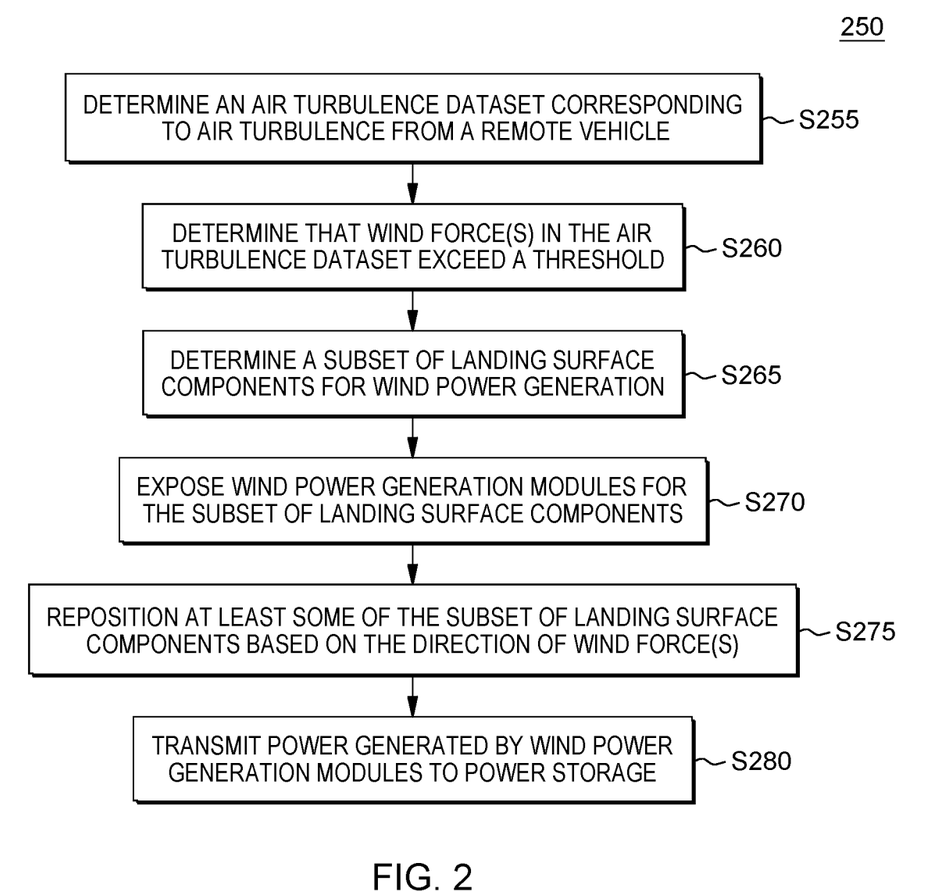
FIG. 2 is a flowchart showing a first embodiment method performed, at least in part, by the first embodiment system.
Figure 3:
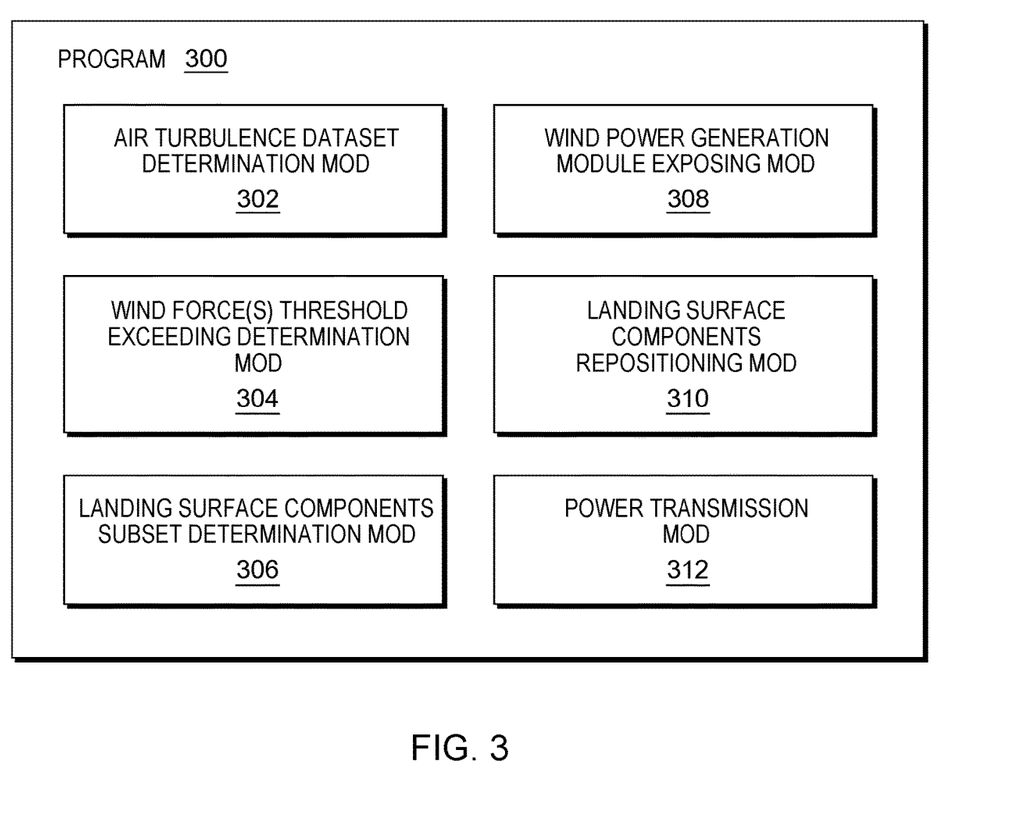
FIG. 3 is a block diagram showing a machine logic (for example, software) portion of the first embodiment system.

As shown in FIG. 1A, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1A, 1B, 2 and 3.

Processing begins at operation S255, where air turbulence dataset determination module ("mod") 302 determines an air turbulence dataset corresponding to air turbulence from a remote vehicle. In this simplified embodiment, the air turbulence dataset is determined from wind force datasets measured by landing surface 116 of FIG. 1A, originating from rotors (not shown) of remote vehicle 104 as it approaches landing surface 116 for a landing. More specifically, landing surface 116, shown in greater detail in FIG.

1B, includes four landing surface components (118, 128, 138 and 148), which each respectively include wind detectors (120, 130, 140 and 150) used to measure wind force datasets comprising wind direction and wind speed readings. Each wind detector will contribute a separate wind force dataset to the air turbulence dataset independent of the other wind detectors. In this simplified embodiment, wind detector 120 measures a wind force dataset corresponding to a 15 mile per hour (mph) wind speed originating from directly above landing surface component 118, wind detector 130 measures a wind force dataset corresponding to a 12 mph wind speed originating from above and to the West of landing surface component 128, wind detector 140 measures a wind force dataset corresponding to a 12 mph wind speed originating from above and to the East of landing surface component 138, and wind detector 150 measures a wind force dataset corresponding to a 9 mph wind speed originating from above and to the north of landing surface component 148. While in this simplified embodiment, landing surface 116 includes four landing surface components, the four landing surface components are an illustrative example of a landing surface that may include many landing surface components, configured to generate power from nearby air turbulences that originate from remote vehicles within the proximate environment. The landing surface components may be configured in a variety of patterns within the landing surface, including, for example, a grid pattern of square shaped landing surface components, or a honeycomb of hexagonal shaped landing surface components.

Processing proceeds to operation S260, where wind force(s) threshold exceeding determination mod 304 determines that wind force(s) in the air turbulence dataset exceed a threshold. In this simplified embodiment, wind force(s) are determined to exceed the threshold when a wind force dataset of the air turbulence dataset has a corresponding wind speed exceeding a predetermined wind speed threshold, which is 10 mph. In this simplified embodiment, the wind force datasets corresponding to wind detectors 120, 130 and 140 all include wind speeds exceeding 10 mph, resulting in wind force(s) threshold exceeding determination mod 304 determining that wind forces in the air turbulence dataset exceed the 10 mph wind speed threshold. This determination indicates that wind detectors 120, 130, and 140 each measured a wind force dataset with a wind speed over the predetermined wind speed threshold of 10 mph, and that wind detector 150 did not measure a wind force dataset with a wind speed over 10 mph. In some alternative embodiments, the threshold is determined by a machine learning model trained using historical datasets of remote vehicles taking off and landing at the landing surface, including how much lift force is required for each remote vehicle to safely take off and land at the landing surface and how much each remote vehicle weighed (including any cargo), outputting a threshold value for minimum lift force required when supplied with a remote vehicle weight (with weight of cargo included, if applicable).

Processing proceeds to operation S265, where landing surface components subset determination mod 306 determines a subset of landing surface components for wind power generation. In this simplified embodiment, landing surface components subset determination mod 306 determines a subset of landing surface components for wind power generation based on which landing surface components correspond to wind detectors that measured the wind force dataset (or datasets) with a corresponding wind speed that exceeds the predetermined threshold. As determined at S260, wind detectors 120, 130, and 140 are determined to have each measured a wind force dataset with a wind speed over the predetermined wind speed threshold of 10 mph. With wind detector 120 corresponding to landing surface component 118, wind detector 130 corresponding to landing surface component 128, and wind detector 140 corresponding to landing surface component 138, landing surface components subset determination mod 306 determines landing surface component 118, landing surface component 128 and landing surface component 138 for inclusion in the subset of landing surface components for wind power generation.

Processing proceeds to operation S270, where wind power generation module exposing mod 308 exposes wind power generation modules for the subset of landing surface components. In this simplified embodiment, wind power generation module exposing mod 308 exposes wind power generation modules for the subset of landing surface components by instructing each of the landing surface components included in the subset of landing surface components for wind power generation to open their respective shutters, allowing wind to flow into their respective wind power generators, which are wind turbines embedded within their respective landing surface components. These wind power generators, when exposed from their shutters, generate electrical power through conversion of wind that passes through them (and their respective landing surface components).

The subset of landing surface components for wind power generation includes landing surface component 118, landing surface component 128 and landing surface component 138, while excluding landing surface component 148. Wind power generation module exposing mod 308 instructs landing surface component 118 to expose wind power generator 126 for wind power generation by opening shutter 124. Landing surface 128 is also instructed by wind power generation module exposing mod 308 to expose wind power generator 136 for wind power generation by opening shutter 134. Lastly, wind power generation module exposing mod 308 instructs landing surface component 138 to expose wind power generator 146 for wind power generation by opening shutter 144. Wind power generator 156 remains closed off from wind power generation by shutter 154 because landing surface component 148 is not included in the subset of landing surface components for wind power generation. In some alternative embodiments, the wind power generators are protected by other types of shielding, such as a retractable cover. In further alternative embodiments, the wind power generators are permanently exposed.

Processing proceeds to operation S275, where landing surface components repositioning mod 310 repositions at least some of the subset of landing surface components based on the direction of the wind force(s). In this simplified embodiment, landing surface components repositioning mod 310 repositions at least some of the subset of landing surface components based on the direction of the wind force(s) in the wind force(s) dataset. For each landing surface component in the subset of landing surface components, landing surface components repositioning mod 310 first determines which direction to reposition the landing surface component to face. To determine which direction, the wind direction reading of the wind force(s) dataset corresponding to the landing surface component is used to optimize efficiency of power generation by the wind power generator of the landing surface component from the wind originating from remote vehicle 104. For a wind turbine, such as the wind power generators in the landing surface components, it is efficient for wind power generation to have the wind turbine facing into the wind (or perpendicular to the direction of the wind), and are considered misaligned when facing other directions. For sources of wind originating from a point, such as air turbulence from a remote vehicle near several wind power generators, each wind power generator may have different directions where wind power generation is most efficient. Orienting the landing surface components, and their respective wind power generators, may enhance the amount of power generated from the air turbulence resulting from remote vehicle 104.

As previously established in this simplified embodiment, the subset of landing surface components includes landing surface component 118, landing surface component 128, and landing surface component 138, and excludes landing surface component 148. For landing surface component 118, the wind direction previously determined at S255 indicated that the wind detected by wind detector 120 is originating from directly above landing surface component 118, resulting in no change in direction for landing surface component 118 as the wind direction is already directly perpendicular to the surface of landing surface component 118. For landing surface component 128, the wind direction previously determined at S255 indicated that the wind detected by wind detector 130 is originating from above and to the West of landing surface component 128, resulting in the direction for landing surface component 128 changing to be tilted towards above and to the West of landing surface component 128 to reach a perpendicular orientation to the wind direction determined through wind detector 130. For landing surface component 138, the wind direction previously determined at S255 indicated that the wind detected by wind detector 140 is originating from above and to the East of landing surface component 138, resulting in the direction for landing surface component 138 changing to be tilted towards above and to the East of landing surface component 138 to reach a perpendicular orientation to the wind direction determined through wind detector 140. No such determination is made for landing surface component 148, which was excluded from the subset of landing surface components.

Next, landing surface components repositioning mod 310 instructs the movement modules of the landing surface components that have new directions to face determined by landing surface components repositioning mod 310. In this simplified embodiment, movement modules 122, 132, 142 and 152 are hydraulic mechanisms that can alter the orientation of their respective landing surface components. As landing surface component 128 and landing surface component 138 are the only landing surface components that have new directions determined by landing surface components repositioning mod 310, landing surface components repositioning mod 310 instructs their respective movement modules to reorient each of them to their new directions. Landing surface components repositioning mod 310 instructs movement module 132 to reposition landing surface component 128 to face up and to the West, and movement module 142 to reposition landing surface component 138 to face up and to the East. In some alternative embodiments, the movement modules are electrical motors connected to gears that tilt and elevate the landing surface components to achieve desired orientations.

Processing proceeds to operation S280, where power transmission mod 312 transmits power generated by wind power generation modules to power storage. In this simplified embodiment, air turbulence originating from remote vehicle 104 generates wind that flows through wind power generator 126 of landing surface component 118, wind power generator 136 of landing surface component 128, and wind power generator 146 of landing surface component 138 to generate electrical power, which power transmission mod 312 instructs the respective landing surface components to transmit said power to the connected power storage unit, power storage 158. In this simplified embodiment, power storage 158 is a battery that converts electrical energy into chemical potential energy.

In some alternative embodiments, power stored in power storage connected to the landing surface (such as power storage 158) is retransmitted to one or more remote vehicles at the landing surface through traditional power transmission couplings or through wireless power transmission techniques, to recharge the remote vehicles for subsequent use. In some other alternative embodiments, the power stored in power storage connected to the landing surface can be retransmitted to one or more wind power generator modules to power the wind power generator modules to generate air turbulence and wind to assist in reducing the rate of descent for a remote vehicle that has insufficient maneuvering capabilities to avoid damage during landing. Wind generated by the one or more wind power generator modules may reduce or limit the damage received by the remote vehicle during said landing.

III. Further Comments and/or Embodiments

Some embodiments of the present invention recognize the following facts, potential problems and/or potential areas for improvement with respect to the current state of the art: (i) remote vehicles and flying cars will be a significant future mode of transportation and delivery of packages; (ii) various companies are working on remote vehicles for product delivery to customer locations; (iii) multi-remote vehicle landing zones are already available; (iv) in this case, the remote vehicles can be parked, take off and land on the landing zones; (v) apart from that, various other remote vehicle landing zones are also available from where remote vehicles can take off and land; (vi) if products are being delivered with remote vehicles, a large number are remote vehicles are required; (vii) from time to time, the remote vehicle has to pick up product and deliver to customer location; (viii) when a remote vehicle is taking off or landing on a surface, the movement rotors of the remote vehicle creates air turbulence on the landing surface and also around the surrounding area of the remote vehicle movement; (ix) considering an area where multiple remote vehicles are taking off or landing, a significant amount of power from the turbulence of air created by rotation of remote vehicle rotors is available for recovery; and (x) there exists a need for techniques by which a landing zone will recover some amount of excess power from the air turbulence created by rotation of the remote vehicle rotors as they take off and land at the landing zone.

Some embodiments of the present invention may include one, or more, of the following operations, features, characteristics and/or advantages: (i) a remote vehicle landing surface and in the surrounding with an array of wind power generation modules; (ii) the wind power generation modules will generate controlled power from the air turbulence created by the remote vehicle rotors while taking off or landing; (iii) the opening and closing of the wind power generation module is controlled dynamically based on required lift force for a remote vehicle to fly or landing; (iv) if a remote vehicle is having any problem with rotors while landing, the said wind power generation modules (or wind turbines) can act in a reverse manner to generate controlled air pressure around the landing zone to adjust the power drop; (v) a landing surface and around the sides of the landing surface will have an array of wind power generation modules; (vi) when a remote vehicle is landing or taking off, the remote vehicle will communicate with the computing system to validate if more than a required level of lift force is generated by the remote vehicle; (vii) accordingly one or more wind power generation modules are opened to recover power from the air turbulence created by remote vehicle during takeoff or landing; (viii) historical airflow turbulence patterns created based on remote vehicle taking off and landing are analyzed (considering the dimension of the remote vehicles, self and payload, number of rotors rotation, external wind force, temperature etc.); (ix) historical learning is also applied to historical lift forces required for remote vehicles to take off, and accordingly based on the historical learning, the wind power generation module will open to generate power if more than a threshold limit of lift force is generated; (x) a sensor is installed in the landing surface and in the remote vehicles which track the air movement pattern during taking off and landing; (xi) accordingly air turbulence patterns (like speed of air flow, spread of the turbulence) are calculated; (xii) the landing surface profile can dynamically change to generate power from different sides around the landing zone; and (xiii) the landing surface profile will continue to change to ensure maximum power recovery is possible.

Some embodiments of the present invention may include one, or more, of the following operations, features, characteristics and/or advantages: (i) during landing of a remote vehicle, if one or more rotors of the remote vehicle do not function properly and the remote vehicle is not able to generate enough controlled power for landing, then the wind power generation module will act in a reverse manner and will create controlled back pressure so that required resultant lift force is created and a hard landing of the remote vehicle can be prevented; (ii) while multiple remote vehicles are landing and taking off around the same point of time, the analyze the resultant air turbulence in the surroundings of the landing zone and accordingly the surface profile of the landing surface will change dynamically to maximize the power recovery; (iii) when any remote vehicle is flying through a low height over the landing zone, identify the remote vehicle movement path towards the landing zone and accordingly the appropriate wind power generation module(s) are activated around the movement path of remote vehicle; and (iv) if at any a time, multiple remote vehicles are landing or taking off, then dynamically identify the position of the remote vehicles in the surrounding area so that resultant air turbulence can be maximized to recover the amount of power with wind power generation modules.

Figure 4:
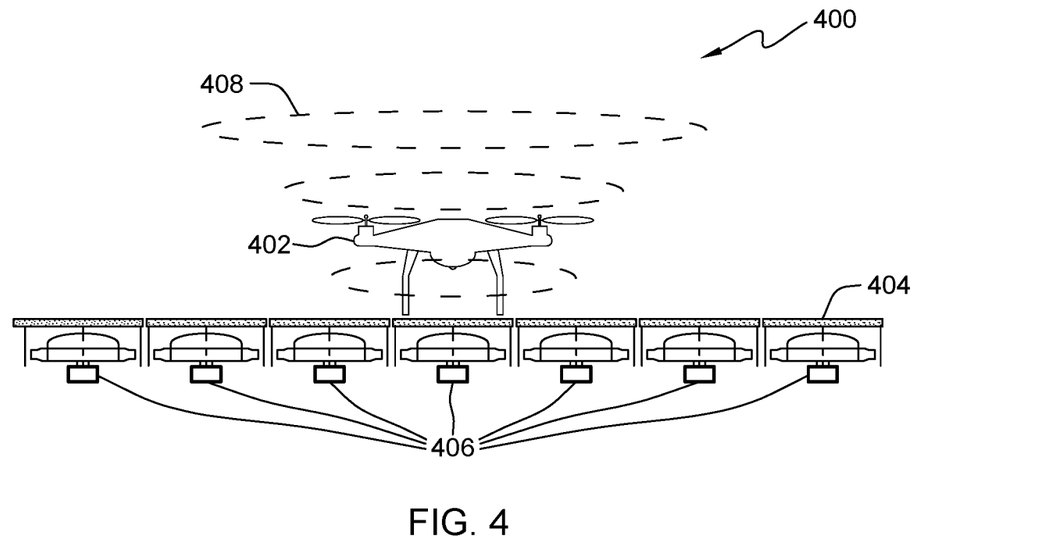
FIG. 4 is a block diagram view of a second embodiment of a system according to the present invention.
Figure 5:
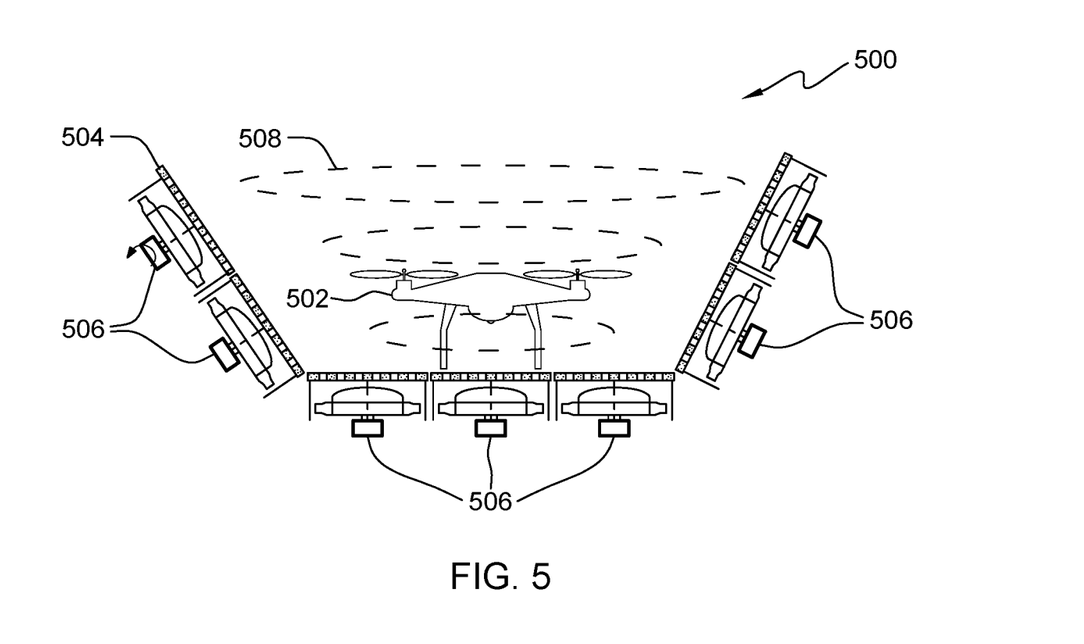
FIG. 5 is a block diagram view of a second embodiment of a system according to the present invention.

FIGS. 4 and 5, discussed in greater detail below, illustrate how the wind power generation modules generate power based on the air turbulence created by remote vehicle during landings and takeoffs, and how the landing or taking off surface can be deformed to generate power from different sides of the remote vehicle.

Diagram 400 of FIG. 4 shows a remote vehicle landing ecosystem including: remote vehicle 402; landing surface 404; wind power generation modules 406; and air turbulence 408. Shutters in landing surface 404 are closed to protect wind power generation modules 406 but can be opened in response to detected (or predicted) air turbulence from remote vehicles such as remote vehicle 402.

Diagram 500 of FIG. 5 shows the remote vehicle landing ecosystem of FIG. 4 during deformation to maximize wind power generation, including: remote vehicle 502; landing surface 504; and wind power generation modules 506; air turbulence 508. Responsive to detecting (or predicting) the presence of air turbulence from a remote vehicle landing, such as remote vehicle 502, or taking off, shutters on landing surface 504 are opened to reveal wind power generation modules 506. Air turbulence 508, resulting from remote vehicle 502 coming in for a landing on landing surface 504, passes through the opened shutters to interact with wind power generation modules 506 to generate power. Portions of landing surface 504 are deformed to encircle the portion of landing surface 504 where remote vehicle will land to maximize power generation from air turbulence 508, adjusting the positions of the wind power generation modules attached to the deformed portions of landing surface 504.

Figure 6A:
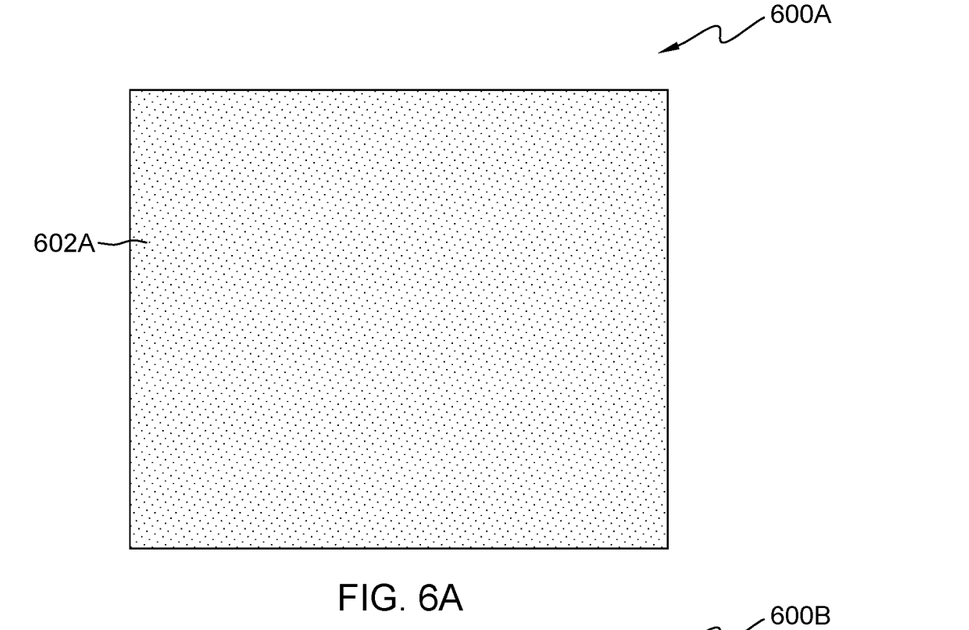
FIG. 6A is a block diagram view of a closed shutter of a landing zone surface according to the second embodiment system.

Diagram 600A of FIG. 6A shows an example of a closed shutter for a wind power generation module in the surface of an example wind power generation module, including: closed shutter 602A.

Figure 6B:
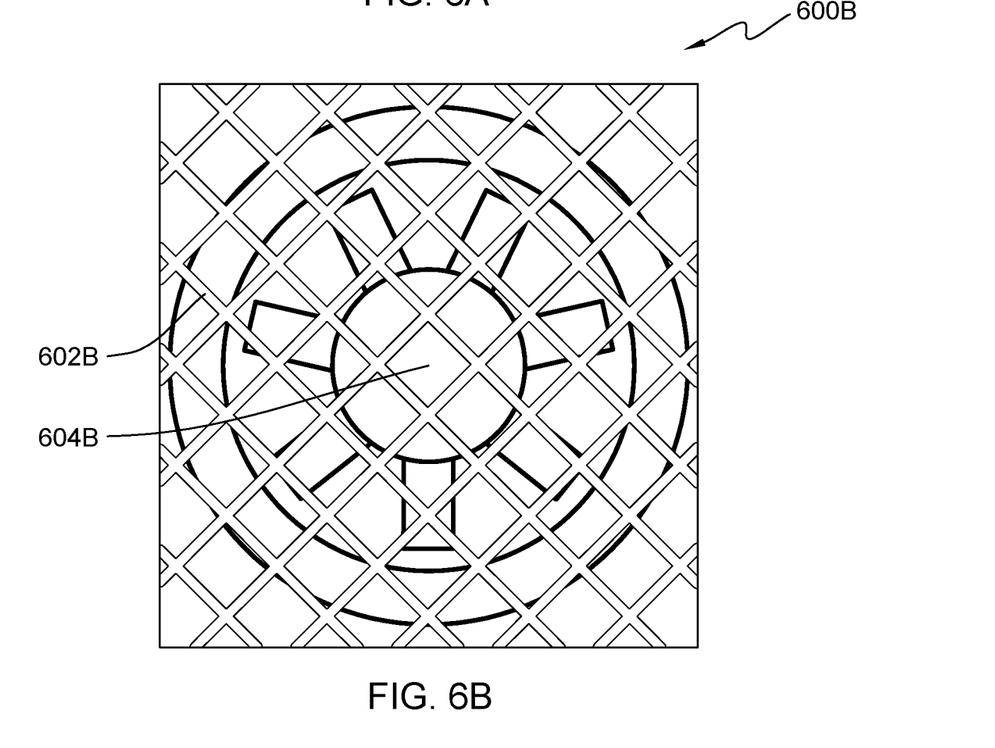
FIG. 6B is a block diagram view of a closed shutter of a landing zone surface according to the second embodiment system.

Diagram 600B of FIG. 6B shows an example of an open shutter for a wind power generation module in the surface of an example wind power generation module, including: shutter 602B; and wind power generation module turbine 604B. When shutter 602B is opened, as shown in diagram 600B, wind power generation module turbine 604B is exposed to oncoming air turbulence, such as that generated by operations of remote vehicles as previously discussed. In such a configuration, wind power generation module turbine 604B generates power from the resulting interactions with nearby air turbulence.

Some embodiments of the present invention may include one, or more, of the following operations, features, characteristics and/or advantages: (i) lower surface of remote vehicle rotor blades will have stress sensors to calculate generated lift force generated based on rotation of the remote vehicle rotor blade; (ii) the remote vehicle will have air flow and pressure measurement sensors; (iii) beneath the landing or take off surface of the emote vehicle(s) is an array of wind power generation modules; (iv) these modules will rotate to generate power from air turbulence (or wind from the movement of rotor blades of remote vehicles); (v) the landing surface will is connected to a set of foldable hinges so that parts of the landing surface can be folded in different angles using hydraulic power; (vi) the purpose of folding of the landing surface is to generate power from different sides of remote vehicle landings (or takeoffs); (vii) the landing surface will also have air flow measurement sensors; (viii) when a remote vehicle is landing or taking off, air turbulence is created; and (ix) the air flow measurement sensors can measure the air pressure, speed, direction of air flow etc.

Some embodiments of the present invention may include one, or more, of the following operations, features, characteristics and/or advantages: (i) wind power generation modules are connecting to an electric power generator and can be activated individually; (ii) each wind power generation module are covered by a shutter so that dust is not accumulated; (iii) also the shutter can be leveraged to selectively activate the wind power generation modules; (iv) remote vehicle(s) have a specification including dimensions, rotor size, weight of self and payload, the rated lift force required for takeoff, and patterns of power generation during soft landings; (v) apart from the remote vehicle specification, the sensor installed in the remote vehicle(s) and landing surface(s) measure the environmental air flow, ambient air pressure, temperature of air etc.; (vi) when a remote vehicle is taking off or landing, the air flow in the surrounding is measured; (vii) in this case the remote vehicle and landing surface will measure the airflow and send the measurements to computing modules; (viii) the stress sensor installed on the remote vehicle rotor blade(s) will calculate the generated lift force while taking off; (ix) the stress sensors will also calculate the gradual reduction of lift force during landing; and (x) the generated lift force is also dependent on surrounding airflows, ambient air pressure, air temperatures etc.

Some embodiments of the present invention may include one, or more, of the following operations, features, characteristics and/or advantages: (i) the sensor feed from the remote vehicle(s) and landing surface(s) will track the air flow in the surrounding areas; (ii) accordingly the computing modules will calculate the air turbulence pattern in the surrounding area(s) and the spread of the air turbulence in the surrounding area(s); (iii) the proposed landing and takeoff ecosystem will also calculate the spread of the air turbulence; (iv) basically how far from the landing point the air flow movement can be tracked; (v) tracking the remote vehicle landing and takeoff zone and which surrounding will have the air turbulence; (vi) calculating if the generated lift force is more than a required limit to achieve liftoff; (vii) during landing, track if the rate of reducing the lift force is within the threshold limit; (viii) the shutter of the landing surface will be opened so that the turbulence created by the remote vehicle can rotate the wind power generation module and power can be generated; (ix) the sidewise wind flow will also be tracked; (x) accordingly, identifying how the surface pattern is to be changed so that power can also be generated from sidewise wind flow; (xi) if multiple remote vehicles are to takeoff or land, identifying the appropriate landing or taken off zone so that resultant air turbulence can be maximized; (xii) when the resultant air turbulence zone is identified, the landing surface will dynamically be deformed so that power generation can be maximized based on remote vehicle landing and taking off; and (xiii) during landing of a remote vehicle, if the one or more rotor blades are having problems and the remote vehicle is landing at speeds above a threshold speed range which might damage the remote vehicle, then the said wind power generation module will switch roles so that it is creating required back pressure to assist the remote vehicle towards a soft(er) landing.

Some embodiments of the present invention may include one, or more, of the following operations, features, characteristics and/or advantages: (i) analyzing historical learning of airflow turbulence patterns created based on remote vehicle takeoffs and landings by considering dimension of the remote vehicle, self and payload, number of rotors rotation, external wind force, temperature etc.; (ii) enabling the wind power generation module to act in a reverse manner, and creating controlled back pressure, so that required resultant lift force is created; (iii) preventing landing of remote vehicle when one or more rotors of the remote vehicle do not function properly and are not able to generate enough controlled power for landing; (iv) analyzing the resultant air turbulence in the surroundings; (v) changing the profile of the landing surface dynamically to maximize the power recovery when multiple remote vehicles are landing and/or taking off at same point of time; (vi) generating power during the takeoff and landing; (vii) store the energy in the landing zone surface; and (viii) if there is problem with some of the rotors of the remote vehicle while landing, reverse operation of some of the wind power generation modules to provide the sufficient wind turbulence that will help to land the remote vehicle in cases of the remote vehicle rotor failures.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) for use with a remote vehicle landing zone having a landing surface including a plurality of independently moveable landing surface modules capable of three dimensional movement, where each independently moveable landing surface module further includes a wind power generation module, the CIM comprising:
- determining an air turbulence dataset corresponding to wind force(s) of air turbulence resulting from operation of a remote vehicle in vicinity of the landing zone applied to at least some of the plurality of independently moveable landing surface modules;
- determining whether the wind force(s) are above a threshold value;
- responsive to determining that the wind force(s) are above the threshold value, determining a subset of the plurality of independently moveable landing surface modules based, at least in part, on the air turbulence dataset;
- for at least some of the subset of the plurality of independently moveable landing surface modules, exposing their corresponding wind power generation module to generate electrical power based on the wind force(s) of the air turbulence resulting from operation of the remote vehicle in the vicinity of the landing zone;
- receiving a second dataset corresponding to the remote vehicle approaching the remote vehicle landing zone for a landing, with the second dataset including information indicative of insufficient maneuvering capabilities to make a soft landing;
- in response to the second dataset, designating the at least some of the subset of the plurality of independently moveable landing surface modules for landing of the remote vehicle;
- instructing the remote vehicle to approach the at least some of the subset of the plurality of independently moveable landing surface modules;
- monitoring a position of the remote vehicle as it approaches the at least some of the subset of the plurality of independently moveable landing surface modules for landing of the remote vehicle;
- reorienting the at least some of the subset of the plurality of independently moveable landing surface modules to face towards the remote vehicle; and
- instructing the wind power generation modules of the at least some of the subset of the plurality of independently moveable landing surface modules to reverse flow to generate air turbulence directed towards the remote vehicle.

2. The CIM of claim 1, further comprising:
generating electrical power through exposed corresponding wind power generation module(s).

3. The CIM of claim 1, further comprising:
determining a misalignment dataset corresponding to at least some independently moveable landing surface modules of the subset of the plurality of independently moveable landing surface modules which are not oriented to a perpendicular direction from the wind force(s).

4. The CIM of claim 3, further comprising:
reorienting independently moveable landing surface modules corresponding to the misalignment dataset to face towards a perpendicular direction from the wind force(s).

5. The CIM of claim 1, further comprising:
changing a profile of at least some others of the subset of the plurality of independent moveable landing surface modules to generate the electrical power from different sides of the remote vehicle, wherein the changed profile comprises independent moveable landing surface modules of the subset arranged around different sides of the remote vehicle.

6. The CIM of claim 1, wherein an amount of air turbulence the wind power generation modules are instructed to generate is based, at least in part, on a machine learning model trained on historical measurements of lift forces required to land remote vehicles with a soft landing.

7. A computer program product (CPP) for use with a remote vehicle landing zone having a landing surface including a plurality of independently moveable landing surface modules capable of three dimensional movement, where each independently moveable landing surface module further includes a wind power generation module, the CPP comprising:
- a machine readable storage device; and
- computer code stored on the machine readable storage device, with the computer code including instructions for causing a processor(s) set to perform operations including:
  - determining an air turbulence dataset corresponding to wind force(s) of air turbulence resulting from operation of a remote vehicle in vicinity of the landing zone applied to at least some of the plurality of independently moveable landing surface modules;
  - determining whether the wind force(s) are above a threshold value;
  - responsive to determining that the wind force(s) are above the threshold value, determining a subset of the plurality of independently moveable landing surface modules based, at least in part, on the air turbulence dataset;
  - for at least some of the subset of the plurality of independently moveable landing surface modules, exposing their corresponding wind power generation module to generate electrical power based on the wind force(s) of the air turbulence;
  - receiving a second dataset corresponding to the remote vehicle approaching the remote vehicle landing zone for a landing, with the second dataset including information indicative of insufficient maneuvering capabilities to make a soft landing;
  - in response to the second dataset, designating the at least some of the subset of the plurality of independently moveable landing surface modules for landing of the remote vehicle;
  - instructing the remote vehicle to approach the at least some of the subset of the plurality of independently moveable landing surface modules;
  - monitoring a position of the remote vehicle as it approaches the at least some of the subset of the plurality of independently moveable landing surface modules for landing of the remote vehicle;
  - reorienting the at least some of the subset of the plurality of independently moveable landing surface modules to face towards the remote vehicle; and
  - instructing the wind power generation modules of the at least some of the subset of the plurality of independently moveable landing surface modules to reverse flow to generate air turbulence directed towards the remote vehicle.

8. The CPP of claim 7, wherein the computer code further includes instructions for causing the processor(s) set to perform operations including:
generating electrical power through exposed corresponding wind power generation module(s).

9. The CPP of claim 7, wherein the computer code further includes instructions for causing the processor(s) set to perform operations including:
  determining a misalignment dataset corresponding to at least some independently moveable landing surface modules of the subset of the plurality of independently moveable landing surface modules which are not oriented to a perpendicular direction from the wind force(s).

10. The CPP of claim 9, wherein the computer code further includes instructions for causing the processor(s) set to perform operations including:
  reorienting independently moveable landing surface modules corresponding to the misalignment dataset to face towards a perpendicular direction from the wind force(s).

11. The CPP of claim 7, further comprising:
  changing a profile of at least some others of the subset of the plurality of independent moveable landing surface modules to generate the electrical power from different sides of the remote vehicle, wherein the changed profile comprises independent moveable landing surface modules of the subset arranged around different sides of the remote vehicle.

12. The CPP of claim 7, wherein an amount of air turbulence the wind power generation modules are instructed to generate is based, at least in part, on a machine learning model trained on historical measurements of lift forces required to land remote vehicles with a soft landing.

13. A computer system (CS) for use with a remote vehicle landing zone having a landing surface including a plurality of independently moveable landing surface modules capable of three dimensional movement, where each independently moveable landing surface module further includes a wind power generation module, the CS comprising:
  a processor set;
  a machine readable storage device; and
  computer code stored on the machine readable storage device, with the computer code including instructions for causing the processor set to perform operations including:
    determining an air turbulence dataset corresponding to wind force(s) of air turbulence resulting from operation of a remote vehicle in vicinity of the landing zone applied to at least some of the plurality of independently moveable landing surface modules;
    determining whether the wind force(s) are above a threshold value;
    responsive to determining that the wind force(s) are above the threshold value, determining a subset of the plurality of independently moveable landing surface modules based, at least in part, on the air turbulence dataset;
    for at least some of the subset of the plurality of independently moveable landing surface modules, exposing their corresponding wind power generation module to generate electrical power based on the wind force(s) of the air turbulence;
    receiving a second dataset corresponding to the remote vehicle approaching the remote vehicle landing zone for a landing, with the second dataset including information indicative of insufficient maneuvering capabilities to make a soft landing;
    in response to the second dataset, designating the at least some of the subset of the plurality of independently moveable landing surface modules for landing of the remote vehicle;
    instructing the remote vehicle to approach the at least some of the subset of the plurality of independently moveable landing surface modules;
    monitoring a position of the remote vehicle as it approaches the at least some of the subset of the plurality of independently moveable landing surface modules for landing of the remote vehicle;
    reorienting the at least some of the subset of the plurality of independently moveable landing surface modules to face towards the remote vehicle; and
    instructing the wind power generation modules of the at least some of the subset of the plurality of independently moveable landing surface modules to reverse flow to generate air turbulence directed towards the remote vehicle.

14. The CS of claim 13, wherein the computer code further includes instructions for causing the processor set to perform operations including:
  generating electrical power through exposed corresponding wind power generation module(s).

15. The CS of claim 13, wherein the computer code further includes instructions for causing the processor set to perform operations including:
  determining a misalignment dataset corresponding to at least some independently moveable landing surface modules of the subset of the plurality of independently moveable landing surface modules which are not oriented to a perpendicular direction from the wind force(s).

16. The CS of claim 15, wherein the computer code further includes instructions for causing the processor set to perform operations including:
  reorienting independently moveable landing surface modules corresponding to the misalignment dataset to face towards a perpendicular direction from the wind force(s).

17. The CS of claim 13, wherein an amount of air turbulence the wind power generation modules are instructed to generate is based, at least in part, on a machine learning model trained on historical measurements of lift forces required to land remote vehicles with a soft landing.

18. The CS of claim 13, further comprising:
  changing a profile of at least some others of the subset of the plurality of independent moveable landing surface modules to generate the electrical power from different sides of the remote vehicle, wherein the changed profile comprises independent moveable landing surface modules of the subset arranged around different sides of the remote vehicle.

* * * * *